United States Patent
Skeans et al.

(10) Patent No.: US 6,626,679 B2
(45) Date of Patent: Sep. 30, 2003

(54) REFLECTIVE ANALYSIS SYSTEM

(75) Inventors: Sharon E. Skeans, Montgomery, TX (US); Karen S. Kutiper, Houston, TX (US); Leah Ellen Harrison, Houston, TX (US); Mary Ann Norton, Houston, TX (US); Betty D. Capel, Montgomery, TX (US); Deborah Magoulick, Spring, TX (US)

(73) Assignee: AceSync, Inc., Houston, TX (US)

( * ) Notice: Subject to any disclaimer, the term of this patent is extended or adjusted under 35 U.S.C. 154(b) by 0 days.

(21) Appl. No.: 10/010,898

(22) Filed: Nov. 8, 2001

(65) Prior Publication Data
US 2002/0081561 A1 Jun. 27, 2002

Related U.S. Application Data
(60) Provisional application No. 60/246,646, filed on Nov. 8, 2000.

(51) Int. Cl.[7] .................................................. G09B 7/00
(52) U.S. Cl. ........................ 434/322; 434/323; 434/353; 434/362
(58) Field of Search ................................. 434/156, 167, 434/178, 188, 191, 201, 209, 236, 238, 276, 298, 300, 322, 323, 335, 350, 353, 362

(56) References Cited
U.S. PATENT DOCUMENTS
6,480,698 B2 * 11/2002 Ho et al. ..................... 434/362
2002/0138590 A1 * 9/2002 Beams et al. ............... 709/218

* cited by examiner

Primary Examiner—John Edmund Rovnak
(74) Attorney, Agent, or Firm—Harrison & Egbert

(57) ABSTRACT

A reflective analysis methodology based upon an interactive, dynamic questioning procedure that implements reflective practices of individual learners. Comprehensive educational activities are designed to model cognitive behaviors of successful students. During interactive diagnostic testing, the learner is asked to reflect on the degree of certainty for each of his answers. After completing the diagnostic test, reflective questions are posed specifically responsive to the learner's answers to selected items. This series of reflective questions is designed to cause the student to search for patterns, clues, and problem-solving strategies related to the specific content being studied. In so doing, thinking behaviors that the student has used or should have used are analyzed, and concomitantly constructs strategic modeling from a database of comprehensive instructional activities for addressing a given concept or skill in the future. System diagnosis provides the teacher with instant feedback on the learner's performance. Thus, the scaffolding of new leaning and follow-up tutorials may be totally customized on a learner-by-learner basis. This customization and individualization is enabled by the branching logic underlying the reflective analysis methodology.

8 Claims, 10 Drawing Sheets

Reading 3 & 4 (TAAS 7 TEKS Correlation)

| Objective | READING 3 | | READING 4 | |
|---|---|---|---|---|
| | Targets | TEKS | Targets | TEKS |
| 1.0 Word Meaning | | | | |
| 1.1 | Root Words | 3.5 D | Root Words | 4.9 D |
| 1.2 | Prefixes | 3.5 D | Prefixes | 4.9 D |
| 1.3 | Suffixes | 3.5 D | Suffixes | 4.9 D |
| 1.4 | Synonyms | 3.5 D | Figurative language | 4.9 D |
| 1.5 | Antonyms | 3.5 D | Multiple-meaning words | 4.9 B |
| 2.0 Supporting Ideas | | | | |
| 2.1 | Stories' sequential order | 3.9 C | Text's sequential order | 4.10 E |
| 2.2 | Story setting | 3.11 I | Story setting | 4.12 I |
| 2.3 | Use of graphic sources (maps, charts, graphs, diagrams) | 3.12 E | Use of graphic sources (maps, graphs, time lines, tables, diagrams) | 4.13 D |
| 2.4 | | | Details | 4.10 F |
| 3.0 Summarization | | | | |
| 3.1 | Summary | 3.9 H | Summary | 4.10 G |
| 3.2 | Story problem/plot | 3.11 J | Main Idea | 4.10 F |

FIG. 1
Reading 3 & 4 (TAAS 7 TEKS Correlation)

| Objective | Targets | TEKS | Targets | TEKS |
|---|---|---|---|---|
| | READING 3 | | READING 4 | |
| 1.0 Word Meaning | | | | |
| 1.1 | Root Words | 3.5 D | Root Words | 4.9 D |
| 1.2 | Prefixes | 3.5 D | Prefixes | 4.9 D |
| 1.3 | Suffixes | 3.5 D | Suffixes | 4.9 D |
| 1.4 | Synonyms | 3.5 D | Figurative language | 4.9 D |
| 1.5 | Antonyms | 3.5 D | Multiple-meaning words | 4.9 B |
| 2.0 Supporting Ideas | | | | |
| 2.1 | Stories' sequential order | 3.9 C | Text's sequential order | 4.10 E |
| 2.2 | Story setting | 3.11 I | Story setting | 4.12 I |
| 2.3 | Use of graphic sources (maps, charts, graphs, diagrams) | 3.12 E | Use of graphic sources (maps, graphs, time lines, tables, diagrams) | 4.13 D |
| 2.4 | | | Details | 4.10 F |
| 3.0 Summarization | | | | |
| 3.1 | Summary | 3.9 H | Summary | 4.10 G |
| 3.2 | Story problem/plot | 3.11 J | Main Idea | 4.10 F |

FIG. 2A
TAAS WRITING (TEKS & TAAS Correlation)

Objective # 1-4: Written Composition

| TEA Target/ Sub-Target | GRADE 4 TAAS | GRADE 4 TEKS | GRADE 8 TAAS | GRADE 8 TEKS | GRADE 10 TAAS | GRADE 10 TEKS |
|---|---|---|---|---|---|---|
| Objective #5 SENTENCE CONSTRUCTION | | | | | | |
| 1.0 Complete sentence vs. fragment | Yes | 4.18 B/F | Yes | 8.17 A/B | Yes | EI, II 3C |
| 2.0 Complete sentence vs. run-on | Yes | 4.18 B/F | Yes | 8.17 A/B | Yes | |
| 3.0 Combining sentences | Yes | 4.19 C | Yes | 8.18 C | | |
| 3.1 For sentence variety (simple, compound, complex) | | | | | | |
| 3.2 Using verbals (gerunds, participles, infinitives) | | | | | | |
| Objective #6: USAGE | | | | | | |
| 1.0 Common affixes (parts of speech) | No | 4.18 C | Yes | 8.17 C | Yes | EI, II 3B |
| 2.0 Subject-verb agreement | Yes | | Yes | | Yes | |
| 2.1 Simple subjects | | | | | | |
| 2.2 Compound subjects | Yes | | Yes | | Yes | |
| 2.3 Indefinite pronoun subjects | No | | Yes | | Yes | |
| 2.4 Subjects separated from verb | No | | Yes | | Yes | |
| 3.0 Pronouns | | | | | | |
| 3.1 Referents | No | 4.18 C | Yes | 8.17 C | Yes | EI, II 3B |
| 3.2 Nominative case - subjects | Yes | | Yes | | Yes | |
| 3.3 Objective case - direct objects, object of preposition | Yes | 4.18 H | Yes | 8.17 H | Yes | |
| 3.4 Possessive case | Yes | | Yes | | Yes | |

FIG. 2B
TAAS WRITING

| Target/Sub-Target | GRADE 4 TAAS | GRADE 4 TEKS | GRADE 8 TAAS | GRADE 8 TEKS | GRADE 10 TAAS | GRADE 10 TEKS |
|---|---|---|---|---|---|---|
| 4.0 Adjective/Adverbs | | | | | | |
| 4.1 Comparative/superlative forms | Yes | 4.18 D | Yes | 8.17 D | Yes | |
| 4.2 Usage forms | No | 4.18 D | No | 8.17 D | No | |
| 5.0 Verbs | | | | | | |
| 5.1 Tense - regular/irregular forms | Yes | | Yes | 8.17 F | Yes | EI,II,3B |
| 5.2 Tense shift | No | | Yes | | Yes | |
| 6.0 Double negatives | No | | Yes | | Yes | |
| 7.0 Parallelism | No | | No | | No | EI, II 3B |
| Objective #7: Spelling, Capitalization, & Punctuation | | | | | | |
| 1.0 Spelling | Yes | 4.17 A, B,D | Yes | 8.16 C | Yes | EI, II 3A |
| 1.1 Syllable constructions/patterns | No | 4.17 A | No | 8.16 C/F | No | |
| 1.2 Roots/common affixes | No | 4.17 B | No | 8.16 C | No | |
| 1.3 High-frequency words | Yes | | Yes | | Yes | |
| 1.4 Words/major spelling rules | Yes | | Yes | | Yes | |
| 2.0 Capitalization | Yes | 4.16 B | Yes | 8.16 B | Yes | EI, II 3A |
| 2.1 First word of sentence | Yes | | No | | No | |
| 2.2 Pronoun "I" | Yes | | No | | No | |
| 2.3 Proper nouns | Yes | | Yes | | Yes | |

FIG. 2C
TAAS WRITING

| Target/Sub-target | GRADE 4 | | GRADE 8 | | GRADE 10 | |
|---|---|---|---|---|---|---|
| | TAAS | TEKS | TAAS | TEKS | TAAS | TEKS |
| 3.0 Punctuation | Yes | 4.16 B 4.18 G | Yes | 8.16 B 8.17 A, G | Yes | EI, II 3A |
| 3.1 End punctuation (./?/!) | Yes | 4.16 B | Yes | 8.16 B | Yes | |
| 3.2 Periods in abbreviations | Yes | | Yes | | Yes | |
| 3.3 Comma - day/year | Yes | | Yes | | Yes | |
| 3.4 Comma - city/state | Yes | 4.16 B | Yes | | Yes | |
| 3.5 Comma - series | Yes | | Yes | | Yes | |
| 3.6 Comma - opening/closing of letters | Yes | | Yes | | Yes | |
| 3.7 Comma - direct quotations | No | | Yes | 8.17 A | Yes | |
| 3.8 Comma - compound sentences/coordinating conj. | No | | Yes | 8.17 A | Yes | |
| 3.9 Comma - complex sentences | No | | Yes | | Yes | |
| 3.10 Comma - coordinate adjectives | No | | Yes | | Yes | |
| 3.11 Comma - nonessential phrases/clauses | No | | Yes | | Yes | |
| 3.12 Comma - nonrestrictive appositives | No | | Yes | | Yes | |
| 3.13 Comma - nouns of direct address | No | | Yes | | Yes | |
| 3.14 Comma - introductory word | No | | Yes | | Yes | |
| 3.15 Comma - introductory dependent clause | No | | Yes | 8.17 A | Yes | |

FIG. 2D
TAAS WRITING

| Target/Sub-Target | GRADE 4 | | GRADE 8 | | GRADE 10 | |
|---|---|---|---|---|---|---|
| | TAAS | TEKS | TAAS | TEKS | TAAS | TEKS |
| Objective #7: Spelling, Capitalization, & Punctuation (Continued) | | | | | | |
| 3.16 Comma - introductory participial phrase | No | 4.16B | Yes | 8.17A | Yes | EI, II 3A |
| 3.17 Comma - parenthetical expressions | No | | No | | Yes | |
| 3.18 Comma - introductory prepositional phrase | No | | Yes | | Yes | |
| 3.19 Apostrophe - contractions | Yes | 4.18 G | Yes | 8.17 G | Yes | |
| 3.20 Apostrophe - possessives | Yes | 4.18 G | Yes | 8.17 G | Yes | |
| 3.21 Semicolon - between independent clauses | No | | Yes | 8.16 B | Yes | |
| 3.22 Colon - opening of business letters | No | | Yes | 8.16 B | Yes | |
| 3.23 Colon - list of words/phrases | No | | Yes | 8.16 B | Yes | |
| 3.24 Colon - hour/minutes | No | | No | | Yes | |
| 3.25 Quotations marks - beginning/end of quotations | No | | Yes | | Yes | |
| 3.26 Hyphens | No | | No | 8.16 B | No | |
| 3.27 Ellipses | No | | No | | No | EI, II 3A |
| 3.28 Italics | No | | No | | No | EI, II 3A |

FIG. 3A     TAAS EXIT LEVEL OBJECTIVES (ACE)

| TEA | ACE | Objective | C | TEK |
|---|---|---|---|---|
| 1.0 | | Number Concepts | | |
| 1.1 a | 1.1 a | Compare and order integers | M8 | 8.1A |
| 1.1 b | 1.1 b | Compare and order positive and negative fractions | M8 | 8.1A |
| 1.1 c | 1.1 c | Compare and order positive and negative decimals | M8 | 8.1A |
| 1.3 | 1.2 | Express numbers in scientific notation, including negative exponents, in appropriate problem situations using a calculator. | M8 | 8.1D |
| 1.4 | 1.3 | Use patterns to generate the laws of exponents and apply them in problem-solving situations | A1 | d3A |
| 2.0 | | Relations, Functions and Algebraic Concepts | | |
| 2.3 a | 2.1 a | Find solutions to application problems involving percents | M8 | 8.3B |
| 2.3 c | 2.1 b | Find solutions to application problems involving proportional relationships | M8 | 8.3B |
| 10.1 e | 2.1 c | Estimate solutions to application problems involving percents | M8 | 8.3B |
| 10.1 f | 2.1 d | Estimate solutions to application problems involving proportional relationships | M8 | 8.3B |
| 2.2 & 11.1 a | 2.2 a | Select appropriate forms of rational numbers to solve real-life problems, including those involving proportional relationship | M8 | 8.1B |
| 2.2 & 11.1 b | 2.2 b | Use appropriate forms of rational numbers to solve real-life problems, including those involving proportional relationship | M8 | 8.1B |
| 2.4 a & 12.1 a | 2.3 a | Generate a bar or circle graph from a data table | M8 | 8.4 |
| 2.4 b & 12.1 b | 2.3 b | Generate a data table from a bar or circle graph | M8 | 8.4 |
| 2.4 c & 12.1 c | 2.3 c | Generate an equation from a graph | M8 | 8.4 |

FIG. 3B   TAAS EXIT LEVEL OBJECTIVES (ACE)

| TEA | ACE | Objective | C | TEK |
|---|---|---|---|---|
| 2.4 d & 12.1 d | 2.3 d | Generate a graph from an equation | M8 | 8.4 |
| 2.4 e & 12.1 e | 2.3 e | Generate an inequality from a verbal description | M8 | 8.4 |
| 2.4 f & 12.1 f | 2.3 f | Generate an equation from a verbal description | M8 | 8.4 |
| 2.4 g & 12.1 g | 2.3 g | Generate a table from an equation | M8 | 8.4 |
| 2.4 h & 12.1 h | 2.3 h | Generate an equation from a table | M8 | 8.4 |
| 2.4 i & 12.1 i | 2.3 i | Generate an graph from a table | M8 | 8.4 |
| 2.4 j & 12.1 j | 2.3 j | Generate a table from an graph | M8 | 8.4 |
| 2.4k & 12.1k | 2.8 | Use mathematical representations such as maps and Venn diagrams to solve problems. | M8 | 8.5A |
| 10.2 a | 2.4 a | Estimate solutions to application problems using appropriate graphs | M8 | 8.5A |
| 10.2 b | 2.4 b | Estimate solutions to application problems using appropriate tables | M8 | 8.5A |
| 10.2 c | 2.4 c | Estimate solutions to application problems using appropriate algebraic equations | M8 | 8.5A |
| 12.2a | 2.5 a | Find solutions to application problems using appropriate tables | M8 | 8.5A |
| 12.2b | 2.5 b | Find solutions to application problems using appropriate graphs | M8 | 8.5A |
| 12.2c | 2.5 c | Find solutions to application problems using algebraic equations | M8 | 8.5A |
| 2.5 | 2.6 | Look for patterns and represent generalizations algebraically for given situations | A1 | b3B |

FIG. 3C    TAAS EXIT LEVEL OBJECTIVES (ACE)

| TEA | ACE | Objective | C | TEK |
|---|---|---|---|---|
| 2.6 | 2.7 | Use the commutative, associative, and distributive properties to simplify algebraic expressions | A1 | b4B |
| 12.4a | 2.9 a | Analyze situations involving linear functions and formulate linear equations to solve problems | A1 | c3A |
| 12.4a | 2.9 b | Analyze situations involving linear functions and formulate linear inequalities to solve problems | A1 | c3A |
| 3.0 | | Geometric Properties and Relationships | | |
| 3.1 | 3.1 | Generate similar shapes using dilations, including enlargements and reductions | M8 | 8.6A 8.7A |
| 3.2 | 3.2 | Graph dilations, reflections, and translations on a coordinate plane | M8 | 8.6A 8.7A |
| 3.3 | 3.3 | Draw solids from different perspectives | M8 | 8.7A |
| 3.4 | 3.4 | Use geometric concepts and properties to solve problems | M8 | 8.7B |
| 3.5 | 3.5 | Locate and name points on a coordinate plane using ordered pairs of rational numbers | M8 | 8.7D |
| 4.0 | | Measurement | | |
| 4.1 a | 4.1 a | Find surface area of prisms using nets | M8 | 8.8A |
| 4.1 b | 4.1 b | Find surface area of cylinders using nets | M8 | 8.8A |
| 4.2 a | 4.2 a | Use formulas to solve application problems involving surface area | M8 | 8.8C |
| 10.1 e | 4.2 b | Use formulas to estimate application problems involving surface area | M8 | 8.8C |
| 4.2 b | 4.2 c | Use formulas to solve application problems involving volume | M8 | 8.8C |
| 10.1 f | 4.2 d | Use formulas to estimate application problems involving volume | M8 | 8.8C |
| 4.3 | 4.3 | Use the Pythagorean Theorem to solve real-life problems | M8 | 8.9A |
| 4.4 a | 4.4 a | Use proportional relationships in similar shapes to find missing measurements | M8 | 8.9B |

FIG. 3D    TAAS EXIT LEVEL OBJECTIVES (ACE)

| TEA | ACE | Objective | C | TEK |
|---|---|---|---|---|
| 4.4 b | 4.4 b | Find solutions to application problems involving similarity | M8 | 8.3B |
| 10.1 g | 4.4 c | Estimate solutions to application problems involving similarity | M8 | 8.3B |
| 4.5 a | 4.5 a | Describe the resulting effects on perimeter when dimensions of a shape are changed proportionally | M8 | 8.10A |
| 4.5 b | 4.5 b | Describe the resulting effects on area when dimensions of a shape are changed proportionally | M8 | 8.10A |
| 5.6 | 4.6 | Describe resulting effects on volume when dimensions of a solid are changed proportionally | M8 | 8.10B |
| 1.2 a | 4.7 a | Approximate the value of square roots as they arise from problem situations | M8 | 8.1C |
| 1.2 b | 4.7 b | Approximate the value of expressions involving $\pi$ as they arise from problem situations | M8 | 8.1C |
| 5.0 | | Probability and Statistics | | |
| 5.1 a | 5.1 a | Find the probabilities of compound dependent events | M8 | 8.11A |
| 5.1 b | 5.1 b | Find the probabilities of compound independent events | M8 | 8.11A |
| 5.2 a | 5.2 a | Use theoretical probabilities to make predictions and decisions | M8 | 8.11B |
| 5.2 b | 5.2 b | Use experimental results to make predictions and decisions | M8 | 8.11B |
| 5.3 | 5.3 | Select the appropriate measure of central tendency to describe a set of data for a particular purpose | M8 | 8.12A |
| 5.4 a | 5.4 a | Select appropriate circle graphs from given information | M8 | 8.12C |
| 5.4 b | 5.4 b | Select bar graphs from given information | M8 | 8.12C |
| 5.4 c | 5.4 c | Select histograms from given information | M8 | 8.12C |
| 13.2 a | 5.5 a | Recognize misuses of graphical or numerical information | M8 | 8.13B |
| 13.2 b | 5.5 b | Evaluate predictions and conclusions based on data analysis | M8 | 8.13B |

FIG. 3E    TAAS EXIT LEVEL OBJECTIVES (ACE)

| TEA | ACE | Objective | C | TEK |
|---|---|---|---|---|
| 4.4 b | 4.4 b | Find solutions to application problems involving similarity | M8 | 8.3B |
| 10.1 g | 4.4 c | Estimate solutions to application problems involving similarity | M8 | 8.3B |
| 4.5 a | 4.5 a | Describe the resulting effects on perimeter when dimensions of a shape are changed proportionally | M8 | 8.10A |
| 4.5 b | 4.5 b | Describe the resulting effects on area when dimensions of a shape are changed proportionally | M8 | 8.10A |
| 5.6 | 4.6 | Describe resulting effects on volume when dimensions of a solid are changed proportionally | M8 | 8.10B |
| 1.2 a | 4.7 a | Approximate the value of square roots as they arise from problem situations | M8 | 8.1C |
| 1.2 b | 4.7 b | Approximate the value of expressions involving $\pi$ as they arise from problem situations | M8 | 8.1C |
| 5.0 | | Probability and Statistics | | |
| 5.1 a | 5.1 a | Find the probabilities of compound dependent events | M8 | 8.11A |
| 5.1 b | 5.1 b | Find the probabilities of compound independent events | M8 | 8.11A |
| 5.2 a | 5.2 a | Use theoretical probabilities to make predictions and decisions | M8 | 8.11B |
| 5.2 b | 5.2 b | Use experimental results to make predictions and decisions | M8 | 8.11B |
| 5.3 | 5.3 | Select the appropriate measure of central tendency to describe a set of data for a particular purpose | M8 | 8.12A |
| 5.4 a | 5.4 a | Select appropriate circle graphs from given information | M8 | 8.12C |
| 5.4 b | 5.4 b | Select bar graphs from given information | M8 | 8.12C |
| 5.4 c | 5.4 c | Select histograms from given information | M8 | 8.12C |
| 13.2 a | 5.5 a | Recognize misuses of graphical or numerical information | M8 | 8.13B |
| 13.2 b | 5.5 b | Evaluate predictions and conclusions based on data analysis | M8 | 8.13B |

REFLECTIVE ANALYSIS SYSTEM

RELATED APPLICATIONS

This application claims priority based upon Provisional U.S. Application Ser. No. 60/246,646 filed Nov. 8, 2000.

TECHNICAL FIELD OF THE INVENTION

This invention relates generally to the field of education, and more particularly, relates to a system for modeling cognitive behaviors of individual learners and for inherently providing instructors with diagnostic feedback.

BACKGROUND OF THE INVENTION

It is known in the art that educators and trainers need a vehicle for checking students' understanding of concepts presumably learned. Whether achieved by formal testing or by obtaining answers to informal questions, an exchange of ideas with students is prerequisite to enable an instructor to prescribe further learning. It will be appreciated that such additional learning may constitute either progressing to a subsequent concept or re-teaching the previous concept. Furthermore, this instructor-student interaction allows students themselves to become aware of the degree to which they have understood and assimilated new learning.

It is known in the art of education that reflection and metacognition are critical to the learning process and, accordingly, are elements associated with the constructivist theory of learning. Under this theory, successful learners clarify their understandings when are able to reflect upon the nature of their own learning processes and able to analyze the ways in which they internally construct knowledge and meaning. It will be appreciated by those conversant in the art that traditional learning theory purports that students absorb information similarly to sponges and then regurgitate acquired information during test-taking activities. The constructivist approach suggests a more complex and dynamic process for learning wherein students develop as learners as they "come to know" the learning processes that they have used. This awareness promotes students' ability to learn and to understand new information. See the text, *The Constructivist Leader* written by Linda Lambert et al., p. 18.

It will also be appreciated that current learning environments may include reflective activities. Most such activities, however, are performed piecemeal and without the benefit and support of technology. Alternatively, such activities may only appear implicitly throughout technology-based resources. In either scenario common in the art, instructors' reflective questioning focus on discerning the learning process of a group of students rather than of individuals. This group approach has proven to be a limitation in achieving significant improvement for individual learners.

Thus, what is needed in the art is a more effective approach and procedure for modeling reflective practices that lead to yield a more accurate diagnosis of student needs. Accordingly, the limitations and disadvantages of the existing procedures known in the art are overcome with the present invention which provides improved means and techniques for more effective instruction.

SUMMARY OF THE INVENTION

In one embodiment of the present invention, there is provided a methodology for implementing comprehensive instructional activities that inherently improve the diagnostic process by modeling reflective practices for individual learners. The preferred embodiment of the present invention provides an online system of comprehensive instructional activities that inherently improve the diagnostic process by modeling reflective practices for individual learners. As will become clear from the detailed description, the preferred embodiment of the present invention enables individual learning to be achieved in a manner hereinbefore unknown in the art.

Embodiments of the present invention provide a synergy between reflective analysis techniques and related diagnostic testing that it has been found significantly facilitate individual learning. During and after diagnostic testing, a series of reflective questions is posed to a student, thereby causing the student to apply patterns, clues, and problem-solving strategies to the specific content being studied. In so doing, the the present invention reviews a student's thinking behaviors and concomitantly constructs strategic models for subsequently addressing a given concept or skill.

Both the individual student and teacher benefit from the versatility of this approach. An important feature and advantage of the present invention is the immediacy of the feedback received. Since the questions posed to the student correspond to the questions a teacher would ideally ask if class-time permitted, the student could respond any time and anywhere. It is well known in the art that prompt and thorough feedback enhances learning and retention of acquired information.

Another feature and advantage of the present invention is that students' affirmation of known concepts and skills may be totally customized and individualized, on a student-by-student basis—inherently and automatically. It is yet another feature and advantage of the present invention that scaffolding of new learning for students may be totally customized and individualized, on a student-by-student basis—inherently and automatically—using a database of instructional activities.

Branching capabilities of the system taught by the present invention, supported by underlying logic, particularly apparent in the computerized and on-line embodiments, enables each student to respond asynchronously to the plurality of reflective questions. Based on correct or incorrect responses, the system either leads the learner through multiple meta-cognitive questions or terminates that series in favor of an alternative series more attuned to that individual learner. As a result of this individualization and adaptive feature of the instant system, the teacher or trainer receives superior feedback regarding the underlying quality of the learner's understanding than would be received from a conventional test score.

It is an object of the present invention to provide a methodology that diagnoses students' conceptual and reflective deficits.

It is another object of the present invention to provide a methodology for modeling and reinforcing reflective strategies.

It is another object of the present invention to provide a system that inherently incorporates a student's affirmation of known concepts and skills into an internal database that uses reflective analysis questioning procedures to automatically generate a totally customized and individualized learning regimen on a student-by-student basis.

It is still another object of the present invention to provide a system that instantaneously prescribes instructional tutorials for a learner's remediation or enrichment, depending upon diagnostic test results coupled with the student's responses to reflective analysis question sequences.

These and other objects and features of the present invention will become apparent from the following detailed description, wherein reference is made to the figures in the accompanying drawings. Like numerals in these drawings refer to like components.

IN THE DRAWINGS

FIG. 1 depicts a tabulation of objectives and targets for reading tested by TAAS and TEKS standardized tests directed to the third and fourth grade levels under the reflective analysis system of the preferred embodiment of the present invention.

FIGS. 2A–D depict a tabulation of objectives and targets for writing tested by TAAS and TEKS standardized tests directed to the fourth, eighth, and tenth grade levels under the reflective analysis system of the preferred embodiment of the present invention.

FIGS. 3A–E depict a tabulation of objectives and targets for mathematics tested by TAAS and TEKS standardized tests directed to the exit grade level under the reflective analysis system of the preferred embodiment of the present invention.

DETAILED DESCRIPTION

The reflective analysis methodology of the present invention will be described in the context of reading reflections and writing reflections applied to a student in a school environment. As will become clear to those skilled in the art, embodiments of this methodology may be applied to virtually any learning situation in schools, colleges, industry, government, etc.

Reading Reflections

The term "reflection" contemplated by the present invention is the act of a student or a learner carefully considering the basis for his own actions or thought processes. That is, a student or learner may ask himself such questions as: "How did I arrive at this point in time?" "Why did I choose this path to reach this point?" "Did this path provide me the greatest understanding?" If the learner failed to select the path leading to optimal learning understanding, then he might ask himself: "What could I have done differently to arrive at the best path?"

It will become clear to those skilled in the art that the present invention addresses how to guide a learner-reader to the point of being able to monitor his own understanding. It will also become clear that the present invention further addresses how to guide a student-reader how to adjust any misunderstandings. The system of the present invention enables a student to ascertain both what he knows and what he does not know. It has been found, interestingly, that for some students, this process comes naturally. On the other hand, many students need direct support as a prerequisite to acquiring the critical ability to gain insight into their own thinking process.

For skilled readers, reflection is both a critical and natural aspect of reading. As will be appreciated by those skilled in the art, skilled readers reflect continuously while engaging in the reading process. Realizing that effective, productive reading must make sense, such readers use an array of strategies to accomplish comprehension, such as setting a purpose for reading, activating background knowledge to help with understanding, predicting and adjusting predictions during reading, summarizing while reading, and ultimately reflecting upon what has just been read. Skilled readers know when they are no longer making sense out of text; at that point, they are able to stop or pause and assess what has gone awry so that the problem may be remedied. According to Pearson, "Expert readers are more likely to look back at the text to resolve a problem." See, Pearson, P. D., et al., "Developing Expertise in Reading Comprehension," *What Research Has to Say About Reading Instruction,* S. J. Samuels and A. E. Farstrup (Eds.),. Newark, Del.: IRA (1986), p. 160.

The reflective analysis system taught by the present invention provides a methodology wherein reading occurs at several levels and leads students to continuously apply self-questioning to improve individual understanding. The first level is evident during test-taking which may be either administered manually, or via a computerized implementation, or via computerized and connected to the Internet or private network via browser software or the like. After answering each test item, a student is asked to reflect and evaluate his own performance. Under the preferred embodiment—implemented for Internet access—he does so by clicking on one of the statements: "I am sure I got this answer right." "I think I got this answer right." "I guessed at this answer." The second level of reflective analysis preferably occurs after a student has completed an entire diagnostic test. At the global test level, a student is asked to reflect on the prose passages that appeared on the test. This reflection is achieved by responding to questions such as: "Which passage did you like best?" "Which passage was the most difficult to read and understand?" Finally, the item level reflective analysis leads students through a step-by-step methodology intended to reinforce the procedure prerequisite to arrive at correct responses. Each of these items focuses on a standardized test or the like that has a learning target reflected in that item. For instance, in Texas, the Texas Assessment of Academic Skills Test (abbreviated "TAAS" for convenience) is a state-mandated indicia of students' learning achievement and capabilities. Examples from TAAS will be used herein for illustration purposes, but not for limitation purposes. A series of guided questions walk a student through each item choice to analyze why it could or could not be the correct choice. It will be appreciated that this methodology reinforces the thinking prerequisite to determine correct responses related to specific reading objectives and targets assessed on TAAS and the like.

It will become clear to those skilled in the art that the reflective analysis system of the present invention ultimately causes readers to question the text itself. This procedure inherently intensifies and deepens a reader's engagement with the text and, consequently, urges focus on a plurality of questions to ask while reading. It should be evident to those skilled in the art that this aspect of the present invention provides the benefit of improving reading comprehension independently of testing.

Referring now to FIG. 1 there is seen a tabulation of objectives and targets for reading tested by the Texas Assessment of Academic Skills ("TAAS") and the Texas Essential Knowledge and Skills Test (abbreviated "TEKS" for convenience) standardized tests directed to the third and fourth grade levels under the reflective analysis system taught by the present invention. In particular, there is enumerated the topical breakdown for reflective analysis treatment applied to word meaning, supporting ideas, summarization, relationships/outcomes, inferences/generalizations, points of view/propaganda/facts and opinions.

Consider a reading example. Suppose that a third grade student has read six 350–450 word passages and has completed a 36-item diagnostic test. Based on the passage that he indicated was his favorite, the online system of the preferred embodiment randomly generates items that the student got correct, as well as some that he missed. One such item-level reflective analysis is:

The third grade student identified the following passage, "Snakes," as his favorite:

(1) Snakes are one of the most beautiful animals on earth. However, many people fear them. Many different kinds of snakes live on the Earth. Snakes live everywhere except in Antarctica.

(2) The Body

The snake's body is odd. It is long and thin. Yet it has many of the same kinds of inside parts that a person has. The snake's body parts work just like a person's body parts work. The snake has a heart, lungs, liver, stomach, intestine, gall bladder and kidney. A snake's body keeps growing until it dies. It grows very fast when it is young. An older snake grows more slowly.

(3) The Skin

The snake's skin is very important. The hard scales protect the snake's softer inside parts. The colors and patterns help hide the snake. Snakes are not slimy. Their skin is hard and shiny. It helps the snake slide easily over the ground. Snakeskin has three layers: an outer layer, middle layer and bottom layer. The snake sheds the outer layer as it grows. The middle layer grows a new outer layer. The bottom layer is the colored layer. It shows through the top two layers. A young snake sheds its skin more than seven times in a year.

(4) How Snakes Move

Snakes have no legs. They climb trees, swim and go almost anywhere they choose. Snakes move in many ways. They move sideways. They push against rocks, sticks or other objects on the ground. Snakes move in a caterpillar-like motion. They push and inch along the ground. Snakes move in loops. This movement helps them move across a desert.

(5) Food

Snakes are meat-eaters. They eat animals, such as rats, which people do not like. Snakes do not chase their food. Instead, they choose to surprise it. Snakes sneak up on an animal or hide. They wait for it to come close. Then they grab it.

(6) Snakes eat different kinds of animals and insects. Their teeth are not good for chewing. Snakes must swallow their food whole.

(7) Poisonous Snakes

About 400 kinds of snakes are poisonous. Less than 50 different kinds are actually dangerous to people. The largest of all poisonous snakes is the King Cobra. The most dangerous snake in North America is the Western Diamondback Rattlesnake.

(8) Snakes do not want to poison humans. Their venom is used for catching food. Snakes usually try to get away from people. They try to frighten the stranger away before biting it. People need to be careful in places where snakes live. Many times people can avoid snakebites.

(9) Snakes are interesting and beautiful animals. They live successfully in most parts of the Earth. Many people are afraid of snakes. They do not understand that snakes can be very helpful to people. If left alone, snakes do not harm people.

Corresponding to this Snake passage, the following illustrates reflective analysis for one test item contemplated by the present invention. As will be readily understood by those skilled in the art, this example models the cognitive procedures for TAAS and TEKS objective for word meaning. The series of questions and activities presented to the student, and the underlying logic and branching capabilities of computerized and on-line system embodiments are described in detail.

Test Item Reflective Analysis: Objective 1—Word Meaning

In this passage, the word venom means

A. heart.

B. saliva

C. medicine

D. poison

If the system of the present invention generated the above item from the diagnostic test, the following instructional modeling would appear to guide the student through his reflective process. Preferably, a computer screen reveals the following problem solving strategies to the student reader: "Think about the reading clues that helped you choose the answer. Now read paragraph 8 again. Select words or sentences that helped you know what venom means in this passage. Insert the answer choice in the selected sentence to see if it makes sense in the passage."

To model this strategy, paragraph 8 appears on the screen. The student is asked to highlight words or sentences that might give a clue to the meaning of the word venom. As the student selects words or phrases, the system preferably allows only relevant words or phrases to be highlighted. Examples in this passage include: "Snakes do not want to poison . . . " and "Their venom is . . . " Next, the student is asked to substitute each of the four answer choices for the word venom to discern which choice makes sense. For example, the following sentence appears on the screen:

Their heart is used for catching food.

The following reflective question is posed: Does a snake use its heart to catch food?

The student responds via "yes" or "no" radio buttons or the like. Branching logic preferably enables a "yes" response to require the student to repeat his thinking process for answer choice A. On the other hand, a "no" response allows him to move on to consider answer choice B.

Since this problem solving strategy for using context clues to determine word meaning is that of substituting multiple words within a similar syntactical structure, the instant procedure is repeated for the student for answer choices B, C, and D. This reflective analysis methodology concludes with a final teaching point as the following question appears:

When you want to find a context clue in another passage, what will you think about?

Using an online scribble pad or the like, the student is asked to word process an original explanation of his understanding of how to determine word meaning using context clues. Finally, the following concluding teaching point appears on the screen:

Reread words and sentences around an unknown word when trying to figure out its meaning. Try substituting other words in the sentence for the word.

At this point in the reflective procedure, the student will preferably be prevented from returning to the scribble pad or the like where he wrote his original explanation for using context clues. It will be evident that the instant procedure not only models an appropriate thinking process for this reading objective/target for the student, but also provides detailed feedback indicating the student's reflective process for the teacher. By analyzing the student responses for individual answer choices during a diagnostic test, the teacher can determine areas of clarity and areas of confusion. Additionally, the original description via the online scribble pad or the like provides the teacher further concrete evidence of the student's understanding of this concept. Based on the student's original and final answer choices for this item coupled with his responses during the reflective analysis procedure, the teacher can more easily diagnose the student's cognitive deficits and prescribe further instruction.

It should be evident to those skilled in the art that this illustration is only one of a plethora of examples that could capture the interaction between a learner and the reflective analysis methodology of the present invention, which is encountered by the learner depending upon his particular learning needs and grade level objectives. Similarly, in an industrial setting, the particulars of the interactive aspect of the reflective analysis methodology would depend upon the skills being taught and the education and experience of the learner.

Writing Reflections

Reflection techniques contemplated under the present invention are crucial to building independent users of language. It will be appreciated by those skilled in the art that the criticality of this reflection approach is attributable to compelling learners to take control of the learning process by analyzing the underlying strategy, the strategy's purpose, the success of the strategy, and ways of improving the strategy's success.

Following and improving upon the teachings of Donald Murray in "Teaching the Other Self," and the suggestions of Linda Fielding and P. David Pearson regarding the "gradual release" model, the present invention provides a comprehensive instructional methodology that builds the independence which enables learners to avail themselves of successful reading and writing strategies. See, Linda G. Fielding and P. David Pearson, "Reading Comprehension: What Works." *Educational Leadership,* (February, 1994) pp. 62–68; and Donald Murray, *Teaching the Other Self: The Writer's First Reader,* in Thomas Newkirk (Ed.), *To Compose: Teaching Writing in High School and College,* Portsmouth, N.H.: Heinemann, Second Ed. 1990, pp. 113–123.

It will be clear that for acquisition of patterns of standard usage, spelling, capitalization, and punctuation and effective standard sentence construction, reflection contemplated by the present invention is crucial. Indeed, the reflective learner must be able to analyze correct and effective patterns, derive common sense rules, and use clues provided by the words and structures within sentences in order to develop sound proofreading strategies. Accordingly, the reflective analysis techniques implemented in diagnostic materials and the like for written language and sentence construction provide students with a systematic set of questions designed to encompass the major targets for each of the areas of usage; spelling, capitalization, and punctuation; and sentence construction. It will become clear that the questions presented to learners by embodiments of the present invention aim to guide students to analyze sentences by seeking clues provided by the words and structures.

For example, consider analyzing the sentence: "The girl standing with the adults walk the tightrope." A student would be asked if the sentence contains a "subject/verb clue," which would cause him to revise the sentence. A subject/verb clue is defined as an existing subject which calls for a specific person and number in the verb choice. The answer is "yes." The subject/verb clue is the subject, "the girl," which requires the third person singular verb "walks." Under the methodology of the present invention, after a student has had an opportunity to consider possible relevant questions and to identify related clues in the test passage, he is given the relevant answers together with a transferable explanation of the related clues.

For students needing more help, of course, tutorials and the like are provided. These tutorials, based primarily on constructivist learning theory, provide direct instruction of the concepts supporting clues to standard language and sentence construction, together with on-going reflection upon the learning. It will be appreciated that by providing the learner with a set of clue questions and a process for using them for each type of item and supporting the strategies with focused tutorials, embodiments of the present invention teach students a set of reflective strategies that enable successful choices to be made on standardized tests such as TAAS. These skills, of course, are readily transferred to effective proofreading and revising protocols in real-world communications and the like.

As an example, consider a reflection template or model intended for 8th Grade TAAS Writing. An eighth grade student will read eight to ten 50–200-word passages and complete a 40-item diagnostic test. According to the present invention, the reflective analysis system in the context of written language occurs at several levels. The first level is evident during test-taking; under the preferred embodiment, this test-taking is conducted online. After answering each item, the student is asked to reflect and evaluate her own performance. She does so by clicking on one of the following statements: I am sure I got this answer right. I think I got this answer right. I guessed at this answer.

The second level of reflection occurs after the student has completed the entire diagnostic test. The present invention preferably sorts the student's responses by the objectives and the targets within those objectives being tested. Based upon results of the reflective-analytical engine of the present invention, processing a student's answers to essentially three types of questions—usage, mechanics, sentence construction—the student is automatically given a total of three reflections. Under the preferred embodiment, if the student did not correctly answer 10 of 12 questions pertaining to usage, 12 of 14 questions pertaining to mechanics, or 12 of 14 questions pertaining to sentence construction, then she is given one item of reflection from that objective which zeroes in on one of the targets where most of these errors were made. By contrast, if the student misses only one question in any of these three areas, then she receives that item in reflection. It will be understood that other reflections will constitute items from second and third targets within an objective where the student committed an error and correct responses for reinforcement. It should evident to those skilled in the art that the threshold percentage of correct answers may be varied according to the circumstances and requirements of the particular learning environment. Thus, while 10/12 or 83% may be appropriate for a conventional middle school environment, percentages ranging from 75% to 90% may be appropriate for certain industrial environments. For instance, learning incident to a panoply of safety procedures for an oil refinery may demand a 90% threshold to satisfy OSHA Regulations, while office procedures for a law office may demand only a 75% threshold for adequately learning filing or the like.

Using the preferred embodiment of the present invention, the writing teacher-instructor will also have the option of having the student: (1) Look at all of the reflections. (2)

Look only at reflections in one of the objectives of the test. (3) Look only at reflections in specific targets on one objective of the test. The teacher's instruction to the student before all TAAS Writing Reflection of the three types of questions in this section of the test—usage, mechanics, and sentence construction—will preferably focus the student on the following questions: Which type was the easiest for you? Why? Which was hardest? Why?

It will be appreciated that, under the preferred embodiment of the present invention, as each type of these three types of questions is asked, a suitable example appears on the computer screen to promote immediate student identification without the necessity of a technical label. FIGS. 2A–D depict a tabulation of objectives and targets for writing tested by TAAS and TEKS standardized tests directed to the fourth, eighth, and tenth grade levels under the reflective analysis system of the preferred embodiment. More particularly, FIG. 2A enumerates the topical breakdown for reflective analysis treatment applied to sentence construction and usage. Similarly, FIGS. 2B–D enumerate the topical breakdown for reflective analysis treatment applied to spelling, capitalization, and punctuation.

The following is an example of reflective analysis applied to one test item. This example models the cognitive procedures for TAAS and TEKS objective for sentence construction. The series of questions and activities presented to the student, and the underlying associated logic and concomitant branching option, focusing on an on-line embodiment, are described in detail.

Test Item Reflective Analysis: Objective 5—Sentence Construction

Before a student proceeds with sentence construction reflection, he is asked:

What clues would help you make the right choice for sentence construction?

A scribble pad preferably appears on the screen for the student to record his answer. The sentence construction example of the reflective analysis system for written language is based upon the following passage:

Rick had packed his backpack the night before. He had packed it with school supplies. It was the first day back after summer vacation, and Rick was ready early. At exactly 7:30 he walked down the street to the bus stop his friends were already gathering there. As the students boarded the bus, they discussed what their new teachers would be like. This day was similar to other school days that Rick and his friends had experienced. Only one thing was different—the bus didn't stop at the school they had attended for the last three years. It passed the middle school, it dropped them off at the high school. Rick and his friends were finally in the ninth grade!

In the course of interacting with a student, the present invention coaches the student through the analysis of a particular test passage, thusly:

Look at the passage. Does the underlined section contain a sentence construction error? "Rick had packed his backpack the night before. He had packed it with school supplies."

It will be appreciated that thorough reflective analysis includes several factors: Are these correctly written sentences, each including a complete thought? Is an incomplete thought, or sentence fragment, put together with a complete thought? Are two complete thoughts incorrectly combined? Are words or ideas unnecessarily repeated? Do the sentences make sense?

The student is afforded the opportunity to reflect on the passage as a whole before considering each of the four answers for each item. One of the answer choices for each item may be "correct as is," which allows the student to choose the original underlined passage. Then, the student is led through an analysis of each answer choice for each item in the passage. An example follows illustrating the branching logic contemplated by the present invention:

A. Rick had packed his backpack with school supplies the night before.

Is this a correctly written sentence, including a complete thought?

__yes __no (Correct answer: no)

(If answer is "no") Select the incomplete thought.

If the choice were a fragment, the student would be expected to select it by highlighting text on the screen.

Is an incomplete thought or sentence fragment put together with a complete thought?

__yes __no (Correct answer: no)

(If answer is "yes")Select the complete thought.

If the choice contained an independent clause and a dependent clause, the student would be expected to select the independent clause.

Are two complete thoughts incorrectly combined?

__yes __no (Correct answer: no)

(If answer is "yes") Select the first word of the second complete thought.

If two independent clauses were incorrectly combined, the student would be expected to select the first word of the second independent clause.

If this choice combines information from the original underlined section, does it unnecessarily repeat words or ideas?

__yes __no (Correct answer: no)

(If answer is "yes") Select repeated words or ideas.

If the choice repeated words, the student would be expected to select the words repeated.

Does this choice have the same meaning as the original underlined section?

__yes __no (Correct answer: yes)

(If answer is "no") Select any words that change the original meaning.

If the choice presented a different meaning, the student would be expected to select words that change the original meaning.

At this point in the reflective analysis methodology for writing, the student is asked to decide whether "A" is a good possibility that should be kept or a bad choice that should be eliminated. Thus, the following three choices appear on the screen:

__keep

__eliminate

__not sure yet

This activity causes the student to evaluate his responses to see whether or not the underlying clues probed by the questions lead him to choose this answer. Then, he is directed to move on to the second, third, and fourth answer choices, using the same set of questions and protocols to evaluate each. With second and subsequent answer choices, when the student reaches the final overall evaluation of his answer choice, which has hereinbefore been demonstrated, he is asked to decide whether or not the choice is better or worse than the other preceding choices.

According to the preferred embodiment, if a student is given the answer choice "Correct as is," then representative wording would be the following:

"Rick had packed his backpack the night before. He had packed it with school supplies."

Are these correctly written sentences, each including a complete thought?

_yes _no (Correct answer: yes)

Is an incomplete thought, or sentence fragment, put together with a complete thought?

_yes _no (Correct answer: no)

Are two complete thoughts incorrectly combined?

_yes _no (Correct answer: no)

(If the answer is "yes") Select the first word of the second complete thought.

Are words or ideas unnecessarily repeated?

_yes _no (Correct answer: yes)

(If the answer is "yes") Select the repeated words or ideas.

Do the sentences make sense?

_yes _no (Correct answer: yes)

Decide whether this is the best answer choice.

_yes _no (Correct answer: no)

After analyzing each of the four answer choices, the student is led to compare each choice's correctness to his original answer on the test. The student will see the entire passage with his original choice slotted-in. The screen displays the following:

Your first choice was __.

Would you like to keep this answer? _yes _no

The student will see the entire passage with the new choice slotted-in. Then, the student is greeted by the present invention with:

"Congratulations! A is the correct answer," accompanied by a celebratory audio-visual display; or:

"The correct answer is A."

Next, the student is provided with reinforcement for his correct answer or a brief re-teaching if his answer is wrong, in order to facilitate transfer of the reflective analysis strategies to the next question:

Here are a few clues to the correct choice:

"Rick had packed his backpack with school supplies the night before."

This is a correctly written sentence, including a complete thought. It combines information without unnecessarily repeating words or ideas.

Following the methodology of the present invention, the teacher's instructions after the sentence construction reflection focuses upon a student's reflective processes:

In the future, what clues will you look for to help you make the right choice for sentence construction?

A scratch pad appears on-screen, whereupon the student writes answers that can be printed for the teacher. Next, the following bullets or the like flash up one at a time, but the student cannot then re-enter the scratch pad:

Are these correctly written sentences?

Are they complete thoughts?

Is an incomplete thought, or sentence fragment, put together with a complete thought?

Are two complete thoughts incorrectly combined?

Are words or ideas unnecessarily repeated?

Do the sentences make sense?

According to the present invention, the teacher's instructions at the end of TAAS Writing Reflections focuses the student thusly:

Of the three types of questions in this section of the test—usage, mechanics, and sentence construction—which is the easiest for you now? Why? Which is the hardest? Why?

Once again, a scratch pad appears for the student to write answers which can be printed for the instructor. At the conclusion of all sections of the reflective analysis system for writing, the student is provided with feedback on his level of correctness and his level of certainty relative to all test questions. The following information is preferably reported:

You answered__correctly on the Sentence Construction Section.

You thought that you were correct on__of those you answered.

You were not sure of your choice on__of those you answered.

You answered__correctly in the Usage Section.

You thought that you were correct on__of those you answered.

You were not sure of your choice on__of those you answered.

You answered__correctly on the Spelling, Capitalization, and Punctuation Section.

You thought that you were correct on__of those you answered.

You were not sure of your choice on__of those you answered.

The three types of writing reflections—sentence construction, usage, and mechanics—reinforce for students the types of clues that will help them to respond correctly to specific proofreading questions, while providing teachers with diagnostic data about students' understanding of those clues. This focus on underlying clues, or strategies, for answering questions together with the emphasis upon careful thought about answer choices provides students with transferable skills for success in both school and real-world contexts.

Mathematics Reflections

According to the present invention, the heart of the reflective process in mathematics is to ask questions that lead students to use effective problem solving strategies. These strategies are based on and developed from strategies outlined by George Pólya. See, Pólya, George. *How to Solve It: A New Aspect of Mathematical Method.* 2nd ed. Princeton, N.J.: Princeton University Press, 1957. In this classic model for a problem-solving plan, the last step is "Looking Back." An important question in this step is, "Can you use the result or method in other similar problems?" The importance of reflection contemplated by the present invention is highlighted in one of four recommendations in the NCTM Problem Solving Standard:

"Good problem solvers become aware of what they are doing and frequently monitor, or self-assess, their progress or adjust their strategies as they encounter and solve problems. Such reflective skills, referred to "metacognition," are much more likely to develop in a classroom environment that supports them."

National Council of Teachers of Mathematics. *Principles and Standards for School Mathematics.* NCTM: Reston, Va., 2000.

It will be understood that a purpose of the reflective analysis methodology of the present invention applied to mathematics is to enable students to be more deeply aware of the process being used in problem-solving activities. As hereinbefore described in detail, the first opportunity for reflection occurs as a student completes each question on the diagnostic test. The student is asked to consider how sure he is of the way the question has been answered by marking one of three options: "I am sure I got this answer right." "I think I got this answer right." "I guessed at this answer." By so doing, the student is forced to constantly be conscious of how a question has been answered. As part of the feedback given to the student after completion of the testing session is completed, the student is given the results of his answers to these questions in order to make him aware of his feelings about the questions.

As a second level of reflection, the student revisits questions from the test chosen by the reflection analysis system immediately after completing the diagnostic test. Under the preferred embodiment, which corresponds to an on-line system, in addition to reviewing questions over a variety of major content areas, the student's choice of the questions posed for reflection can include questions that vary in problem solving strategy. The underlying logic of this system is designed to choose both those questions the student has answered correctly as well as those that were missed on the initial testing. Consisting of three to seven questions, this level of reflection is designed to address several objectives:

To cause students to reflect upon the item rather than to teach the concept;

To develop and/or practice efficient problem solving strategies, ones which can be used to arrive at an answer using traditional heuristic problem solving strategies that research has indicated will make students better problem solvers, reviewed in a context of the questions to which that strategy might be applied;

To take students through a process or method that will work for that question as well as other questions of the same type, rather than lead them to a specific answer;

To cause students to reflect in a manner that will highlight common errors that are made in order to focus attention on the need to answer questions reflectively instead of by rote and without thought;

To give students who do not know how to begin the problem or get bogged down within the problem step-by-step assistance at the time they are considering that problem;

To suggest to students who already knows how to work the problem an alternative strategy that can be used on future problems so that these more able students will learn to make connections between specific strategies and the characteristics of the problems to which they apply.

As an illustration of the application of the reflective analysis methodology of the preferred embodiment to learning mathematics, consider the following example that addresses exit grade level mathematics skills that are depicted in FIGS. 3A–E. In particular, referring specifically to FIGS. 3A–B, the objectives are seen to include number concepts, and relations, functions, and algebraic concepts. Now referring specifically to FIG. 3C, these mathematics objectives are seen to also include geometry and measurement. Similarly, referring specifically to FIG. 3D, these mathematics objectives are seen to further include probability and statistics. Referring to FIG. 3E, these objectives are seen to include operations involving fractions, integers, estimating, and problem solving. It will become clear that a student is again exposed to each problem that has been encountered during the diagnostic test. The questions for reflection would preferably appear one at a time, and as the student responds to each question, supplemental questions would be presented. During this interactive process, the original question and its answer choices preferably remain on the screen. Included with the student's alternative answers that are shown for each question associated with a reflective student answer, an asterisk or the like denotes the correct answer.

Sample Question from Diagnostic Test

The ratio of juniors to seniors in the concert choir is 4:3. If there are 36 seniors in the concert choir, how many juniors are there?

A. 27
*B. 48
C. 108
D. 144

Reflective Question #1. What operation does the phrase "ratio of juniors to seniors" suggest?

Student Answer Options: + − × *÷

Since the key idea in this problem is ratio, if the student chooses either of the first two symbols, choice of either of these operations indicates that the student has missed the idea of ratio and that further leading questions will be of little or no use in the student's learning process. Thus, the system taught by the present invention would immediately send the student to a beginning tutorial about the underlying concept of ratio and build understanding from the basic level. Choice of the operation of multiplication would bring up a reminder of the meaning of ratio.

Reflective Question #2. A ratio can be represented as a fraction. Highlight the word that represents the quantity that goes in the top of the fraction representing this ratio.

A tool is preferably provided for the student to highlight words in the original test question. Once the student has completed the task, if the word is correct, two boxes representing a fraction are displayed in which the word that the student has highlighted appears on the top.

| juniors |
|---------|

Otherwise, a statement is made to the student to try again. If a second incorrect word is chosen, the correct word appears in the box. In either of the last two instances, the words "juniors" and "seniors" appear in the top and bottom boxes, respectively, of the fraction, and the next reflective question is posed for the student.

| juniors |
|---------|
| seniors |

Reflective Question #3. Test the ratio of each answer choice to 36 as it appears in the box until you find an answer choice has a ratio that is equivalent to the ratio in the problem.

The box used above remains on the screen and additional boxes representing a second and third fraction appears along side the first fraction. In the fraction in the middle the ratio 4:3 will be written. In the fraction on the left a 36 appears in the denominator, and the student is able to type each of the answers one at a time in the top or numerator of the fraction.

| juniors | 4 |    |
|---------|---|----|
| seniors | 3 | 36 |

Once a choice among the student answer options has been made, the boxes will disappear. This approach to the problem illustrates for the student the strategy of working backward using the answers in the problem.

Student Answer Options: A *B C D

Having answered all of these questions, the student is now asked to review the original question and choose an answer, one which may be different from the one chosen when the question was answered originally in the diagnostic test.

Reflective Question #4. Reflecting on these questions, what is your final answer?

Student Answer Options: A *B C D

Answer choices with radio buttons or the like for each answer corresponding to the original list is provided for the student. This is the final reflective question for each item that is reviewed. When the statistics are presented to the student, the number of answers that were changed, both incorrectly and incorrectly, is presented to the student.

Sample Question from Diagnostic Test: A chemical mixture in a science lab requires 3 parts water to 1 part acid. If a container holds 12 pints of this chemical mixture, how many pints of acid are present in the mixture?

*A. 3 pints
B. 4 pints
C. 8 pints
D. 9 pints

Reflective Question #1. The table below represents the information in the problem Highlight the words in the problem suggest that the third line be added to this table?

| water | 3 | | |
|---|---|---|---|
| acid | 1 | | |
| total | | 8 | 12 |
| mixture | | | |

In this example, a box is used to suggest a way to solve ratio problems. A tool is provided for the student to highlight words in the original test question. Once the student has completed the task, if the word is correct, the next question appears. Otherwise, a statement is made to the student to try again. If a second incorrect choice is made, the correct word appears is highlighted.

Reflective Question #2. Fill in the missing numbers in the chart above.

The chart is activated so that answers can be typed into the blank cells. This procedure of using the chart represents an organizational procedure that can be used on many of the problems.

Reflective Question #3. What operation do you use to get the third row in the table?

Student Answer Options: *+ − × ÷

The purpose of asking this question to be certain that the student focuses on what operation has actually been used while filling in the chart.

Reflective Question #4. Look at the table. If you double the amount of mixture, what happens to the amount of water and acid?

Student Answer Options: *both double  both are cut in half  one cut in half because the other is cut in half This question is posed to indicate the student that the once the chart is filled in, it is important to look at the data and to draw conclusions from that data.

Reflective Question #5. If you triple the number of pints of water, how may pints of acid will you need?

A blank is provided for the student into which answer can be typed. This is a question asked of the student to check his understanding of the procedure used to answer the previous question.

Having answered all of these questions, the student is now asked to review the original question and choose an answer, one which may be different from the one chosen when the question was answered originally in the diagnostic test.

Reflective Question #6. Reflecting on these questions, what is your final answer?

Student Answer Options: A *B C D

Again, answer choices with radio buttons or the like for each answer corresponding to the original list is provided for the student. This is the final reflective question for each item that is reviewed. When the statistics are presented to the student, the number of answers that were changed, both incorrectly and incorrectly, is given to the student.

The instructional environment that is embodied in the reflective analysis methodology herein described is one in which a student can consistently monitor all relevant internal processes taking place during problem solving activities. That is, the student is provided a tool that inherently enables him to dedicate conscious attention to the process being used to solve problems. In doing so, he has been found to be more likely to learn to take responsibility for reflecting on his work in general and to make adjustments necessary when solving problems—regardless of whether the problems arise in mathematics class or in the real world.

While the application of the present invention to the subject areas of reading, writing, and mathematics described herein pertain only to certain grade levels of teaching school, it should be clearly understood that the present invention is contemplated to be readily applicable to all subject areas and content fields and to any grade level of education and type of learning and, indeed, to virtually any and all learning environments including corporate and industrial, as well as to any other area to which it applies.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the present invention is to be measured by the scope of the appended claims herein.

What is claimed is:

1. A reflective analysis methodology for interactively diagnosing a learner's cognitive behavior for learning a concept or skill, said methodology comprising the steps of:

subjecting said learner to diagnostic testing consisting of a plurality of diagnostic questions pertaining to said concept or skill;

evaluating the accuracy of said learner's plurality of answers to said plurality of diagnostic questions;

retrieving a first set of a plurality of reflective questions from a reflective questions database, said first set of a plurality of reflective questions selected to be responsive to said learner's diagnostic test accuracy;

having said learner interactively answer each of said first set of a plurality of reflective questions to enable said learner to apply patterns, clues, and problem solving to obtain immediate and thorough feedback regarding said learner's thinking behavior;

prescribing a first set of a plurality of reflective instructional tutorials retrieved from an instructional activity database, for providing said learner with a customized and individualized learning remediation or enrichment experience;

tutoring said learner by said learner interactively answering each of said reflective instructional tutorials of said first set of a plurality of reflective instructional tutorials;

shifting said first set of a plurality of reflective instructional tutorials to a second set of a plurality of reflective instructional tutorials if said learner incorrectly responds to a plurality of tutorial questions of said first set of a plurality of reflective instructional tutorials; and interactively adapting said first set of a plurality of reflective instructional tutorials or said second set of a plurality of reflective instructional tutorials to another alternative set of a plurality of reflective instructional tutorials responsive to said learner's diagnostic test accuracy and said learner's cumulative answers to said reflective instructional tutorials, for continuously and automatically improving said learner's understanding of said cognitive learning behavior.

2. The reflective analysis methodology recited in claim 1, wherein said reflective questions database is based upon the patterns, clues, and problem solving behaviors of known successful and effective individual learners.

3. The reflective analysis methodology recited in claim 1, wherein said learner's answers to each of said plurality of reflective instructional tutorials may be processed asynchronously.

4. The reflective analysis methodology recited in claim 1, wherein said learner's cumulative answers to said reflective instructional tutorials provide feedback to teachers or trainers regarding said learner's quality of understanding of said cognitive learning behavior.

5. The reflective analysis methodology recited in claim 1, wherein said step that subjects said learner to diagnostic testing further comprises selecting from a computerized diagnostic test question database a suitable set of diagnostic test questions according to said concept or skill.

6. The reflective analysis methodology recited in claim 1, wherein said step that evaluates the accuracy of said learner's plurality of answers to said plurality of diagnostic questions reconciles said learner's plurality of answers with correct answers stored in a computerized correct answer database related to said diagnostic test question database.

7. The reflective analysis methodology recited in claim 6, wherein said sequence of steps that retrieves a first set of a plurality of reflective questions from a reflective questions database, that has said learner interactively answer each of said first set of a plurality of reflective questions, that prescribes a first set of a plurality of reflective instructional tutorials retrieved from an instructional activity database, that tutors said learner by said learner interactively answering each of said reflective instructional tutorials, that shifts said first set of a plurality of reflective instructional tutorials to a second set of a plurality of reflective instructional tutorials, and that interactively adapts said first set of a plurality of reflective instructional tutorials or said second set of a plurality of reflective instructional tutorials to another alternative set of a plurality of reflective instructional tutorials is driven by computerized branching logic designed to generate reflective questioning that focuses upon the particular requirements of said individual learner and that forces said learner to understand underlying cognitive processes incident to learning said concept or skill.

8. The reflective analysis methodology recited in claim 7, wherein said learner may remotely access said plurality of diagnostic test questions and said adapted sets of a plurality of reflective instructional tutorials through the Internet or private network.

* * * * *